United States Patent
Xu et al.

(10) Patent No.: US 12,532,352 B2
(45) Date of Patent: Jan. 20, 2026

(54) APPARATUS AND METHODS FOR ALIGNING CONTENTION-BASED WIRELESS COMMUNICATIONS

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 676 days.

(21) Appl. No.: 17/789,026

(22) PCT Filed: Jan. 17, 2020

(86) PCT No.: PCT/CN2020/072649
§ 371 (c)(1),
(2) Date: Jun. 24, 2022

(87) PCT Pub. No.: WO2021/142753
PCT Pub. Date: Jul. 22, 2021

(65) Prior Publication Data
US 2023/0045278 A1    Feb. 9, 2023

(51) Int. Cl.
*H04W 74/0808* (2024.01)
*H04W 72/566* (2023.01)
*H04W 74/08* (2024.01)

(52) U.S. Cl.
CPC ..... *H04W 74/0808* (2013.01); *H04W 72/569* (2023.01); *H04W 74/0891* (2013.01)

(58) Field of Classification Search
CPC .......... H04W 74/0808; H04W 72/569; H04W 74/0891
See application file for complete search history.

(56) References Cited

U.S. PATENT DOCUMENTS 9,967,080 B2    5/2018   Zhang et al.
10,841,914 B2 * 11/2020  Liou ..................... H04L 5/0094
(Continued)

FOREIGN PATENT DOCUMENTS

CN    107105514 A    8/2017
CN    110166182 A    8/2019
(Continued)

OTHER PUBLICATIONS

International Search Report and Written Opinion—PCT/CN2020/072649—ISA/EPO—Oct. 12, 2020.
(Continued)

*Primary Examiner* — Joseph E Avellino
*Assistant Examiner* — Maryam Emadi
(74) *Attorney, Agent, or Firm* — QUALCOMM Incorporated

(57) ABSTRACT

Aspects described herein relate to determining a configuration indicating multiple synchronization points, in time, for contention-based communications, determining, for a given synchronization point of the multiple synchronization points, a contention window using a deterministic function based at least in part on one or more configured parameters, and transmitting, during the contention window, one or more contention-based signals in an attempt to acquire a channel for transmitting communications.

35 Claims, 8 Drawing Sheets

(56) References Cited

U.S. PATENT DOCUMENTS

| | | |
|---|---|---|
| 2018/0176955 A1 | 6/2018 | Salem et al. |
| 2018/0213386 A1 | 7/2018 | Kim et al. |
| 2018/0288797 A1 | 10/2018 | Vannithamby et al. |
| 2020/0053778 A1 * | 2/2020 | Babaei .................. H04W 16/04 |

FOREIGN PATENT DOCUMENTS

| | | | |
|---|---|---|---|
| CN | 110167161 A | 8/2019 | |
| WO | 2016200546 | 12/2016 | |
| WO | 2017164719 A1 | 9/2017 | |
| WO | WO-2018113678 A1 * | 6/2018 | ............ H04W 16/14 |

OTHER PUBLICATIONS

Supplementary European Search Report—EP20914570—Search Authority—The Hague—Sep. 13, 2023.

* cited by examiner

Node0, n=2, N=3

CAT-4 LBT

Node1, n=3, N=4

APPARATUS AND METHODS FOR ALIGNING CONTENTION-BASED WIRELESS COMMUNICATIONS

CROSS-REFERENCE TO RELATED APPLICATIONS

This application is a 35 U.S.C. § 371 National Phase Application of PCT Application No. PCT/CN2020/072649 filed Jan. 17, 2020, entitled "APPARATUS AND METHODS FOR ALIGNING CONTENTION-BASED WIRELESS COMMUNICATIONS," which is assigned to the assignee hereof.

BACKGROUND

Aspects of the present disclosure relate generally to wireless communication systems, and more particularly, to contention-based wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In addition, wireless communication technologies such as 5G NR can be used for communications among devices for operation in a controlled environment, such as in an industrial Internet-of-things (IIoT) environment, which may include nodes intended to communicate with one another in a localized network (e.g., factory automation nodes). In one example, frame-based equipment (FBE) can be employed where a base station acquires a channel, indicates a fixed frame period (FFP) for its transmission and an idle duration at the end of the FFP to allow for transmissions (e.g., by one or more user equipment (UEs)) in a next frame. The FBE approach may be rigid and may require the UE to detect the downlink signal in order to transmit in the next frame.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication is provided. The method includes determining a configuration indicating multiple synchronization points, in time, for contention-based communications, determining, for a given synchronization point of the multiple synchronization points, a contention window using a deterministic function based at least in part on one or more configured parameters, and transmitting, during the contention window, one or more contention-based signals in an attempt to acquire a channel for transmitting communications.

In another example, an apparatus for wireless communication is provided. The apparatus includes a transceiver, a memory configured to store instructions, and one or more processors communicatively coupled with the memory and the transceiver. The one or more processors are configured to determine a configuration indicating multiple synchronization points, in time, for contention-based communications, determine, for a given synchronization point of the multiple synchronization points, a contention window using a deterministic function based at least in part on one or more configured parameters, and transmit, during the contention window, one or more contention-based signals in an attempt to acquire a channel for transmitting communications.

In a further aspects, an apparatus for wireless communication is provided. The apparatus includes means for determining a configuration indicating multiple synchronization points, in time, for contention-based communications, means for determining, for a given synchronization point of the multiple synchronization points, a contention window using a deterministic function based at least in part on one or more configured parameters, and means for transmitting, during the contention window, one or more contention-based signals in an attempt to acquire a channel for transmitting communications.

In a further aspect, a computer-readable medium, including code executable by one or more processors for wireless communications is provided. The code includes code for determining a configuration indicating multiple synchronization points, in time, for contention-based communications, determining, for a given synchronization point of the multiple synchronization points, a contention window using a deterministic function based at least in part on one or more configured parameters, and transmitting, during the contention window, one or more contention-based signals in an attempt to acquire a channel for transmitting communications.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
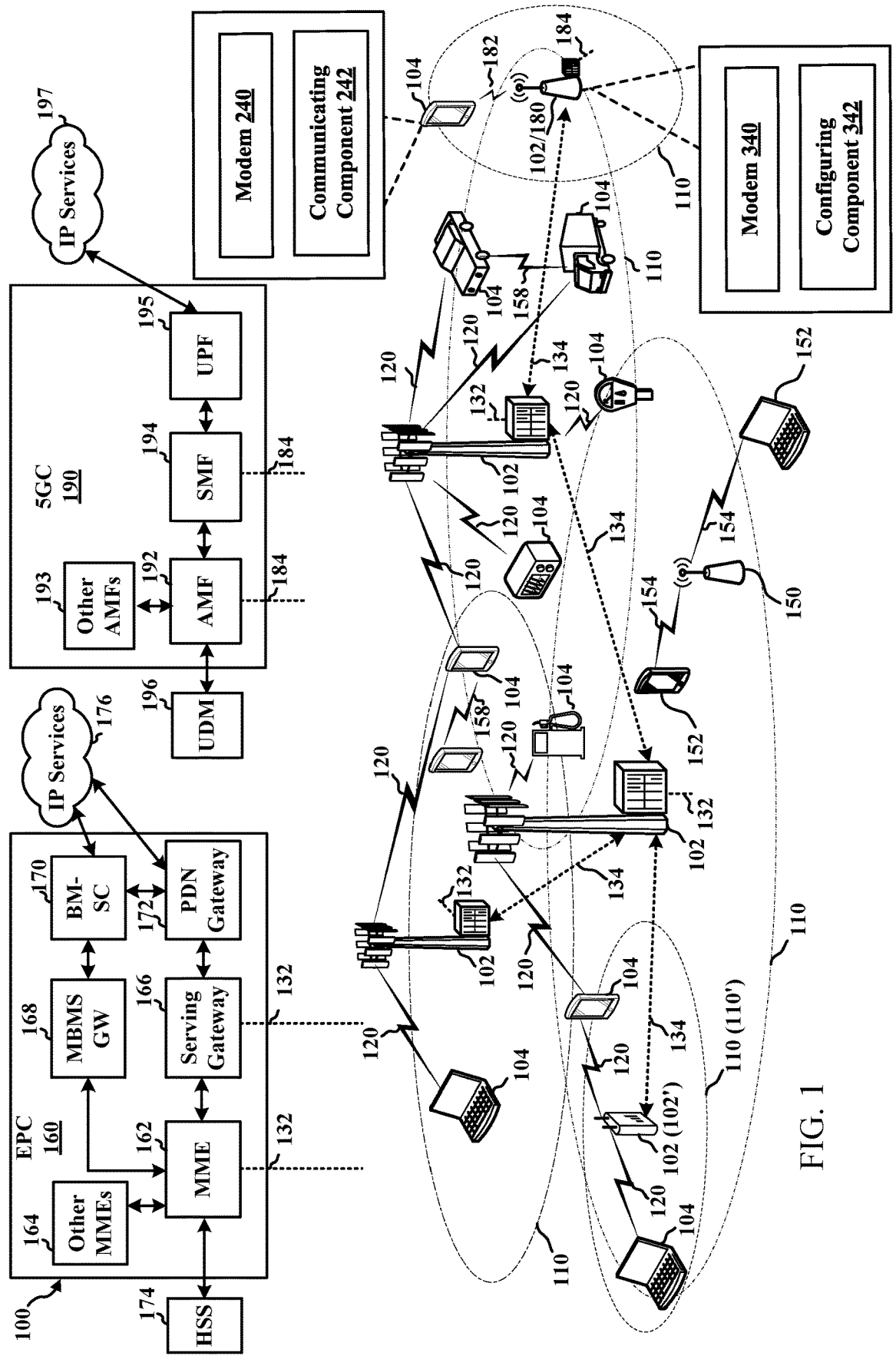
FIG. 1 illustrates an exemplary wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to using contention-based wireless communications for operation in controlled environments where nodes in the environment can communicate by first acquiring a channel by performing a contention-based procedure, such as a clear channel assessment (CCA). A controlled environment may be defined as an environment where all nodes communicating with one another are controlled by a single operator or entity with the ability to control the deployment and the interference environment, such as an industrial Internet-of-things (IIoT) environment where a factory owner can own or control the nodes. In such environments, wireless communication technologies, such as fifth generation (5G) new radio (NR) or other cellular technologies, can be used for communications between the nodes, where the environment can include one or more base stations to facilitate communications between the nodes and a backend network, among the nodes themselves, etc.

As described, previous support for wireless communications in such environment is based on implementing the nodes as frame-based equipment (FBE) with a fixed frame period (FFP) indicated by a base station (e.g., in system information block (SIB) 1). In such implementations, only the base station (e.g., gNB) contends for the channel, with one-shot listen-before-talk (LBT) at the beginning of each FFP. Idle duration is designed at the end of FFP to allow the LBT for transmission in next frame. UE transmissions within a FFP is conditioned on the detection of a base station transmission in the same FFP. A certain processing timeline may be required, in this aspect, for the UE to detect the downlink (DL) signal and respond. In other aspects described herein, the nodes (e.g., UEs) can be implemented as load-based equipment (LBE) to allow more flexibility in communications. For example, an LBE-based implementation may not need a fixed periodic structure, which can be more flexible, may not have the problem to send uplink (UL) signal/channels at the beginning of the fixed frame period, may not require UEs to detect DL signal/channel before UL transmissions. In addition, the LBE-based implementation may be designed to avoid cross link interference based blocking, to avoid LBT failure due to another base station/UE is transmitting in the neighborhood, to reduce the overhead of certain LBT procedure (shorter time gaps), etc., as described herein.

In aspects described herein, synchronization points can be configured, in time, among nodes in the controlled environment (e.g., based on a configuration generated and/or received from a base station or a core network node). For a given synchronization point, each node can determine a contention window using a deterministic function that may be based on received parameters, such that each node determines the same contention window. The nodes can transmit LBT signals during the contention window in an attempt to acquire the channel to transmit wireless communications. This can ensure the nodes are contending for the channel at the same or similar time, which can improve opportunity for communications. In one aspect, preceding communications can be given more time for transmission based on ensuring the nodes use the same contention window.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an aspect of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an aspect, the base stations 102 may also include gNBs 180, as described further herein. In one aspect, some nodes of the wireless communication system may have a modem 240 and communicating component 242 for substantially aligning, in time, contention-based communications, and some nodes may have a modem 340 and configuring component 342 for configuring contention-based communications to be substantially aligned in time, as described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 (and/or one node may have both components 242, 342) for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. In an aspect, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another aspect, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as in an aspect, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat MD UEs, NB-IoT (also referred to as CAT NB1) UEs, as well as other types of UEs. In the present disclosure, eMTC and NB-IoT may refer to future technologies that may evolve from or may be based on these technologies. In an aspect, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an aspect, communicating component 242 can align contention-based communications with other nodes (e.g., other UEs 104, base stations 102, etc.) at least in part by determining synchronization points at which to initiate contention-based access procedure, determining a contention window for transmitting a LBT or other contention-based signal, etc., as described further herein. In an aspect, configuring component 342 can configure one or more nodes to align contention-based communications with other nodes. In an aspect, configuring component 342 can configure the synchronization points, parameters for determining the contention window such that each node determines the same contention window for a given synchronization point, etc., as described further herein.

Figure 2:
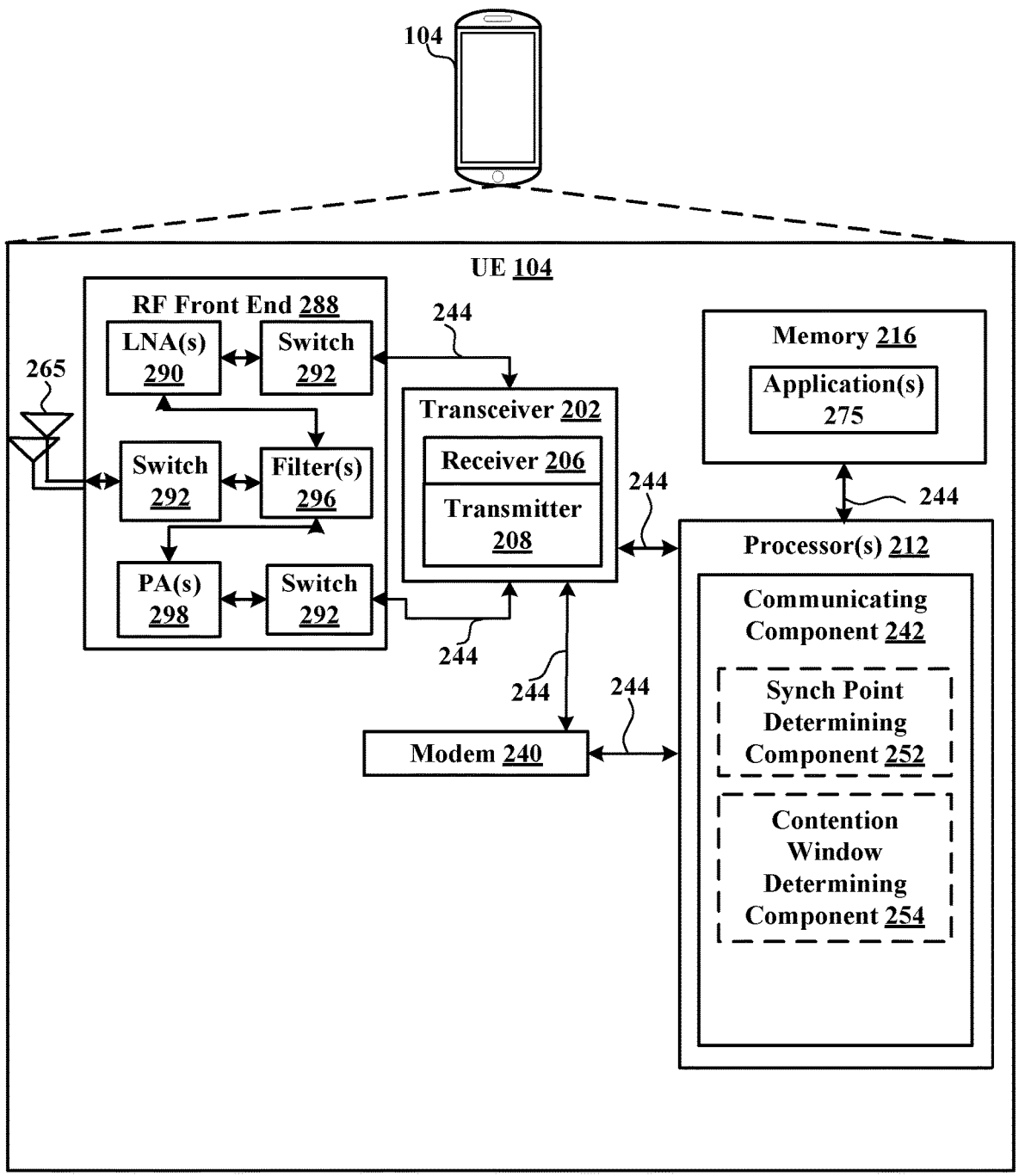
FIG. 2 is a block diagram illustrating an exemplary UE, in accordance with various aspects of the present disclosure.
Figure 3:
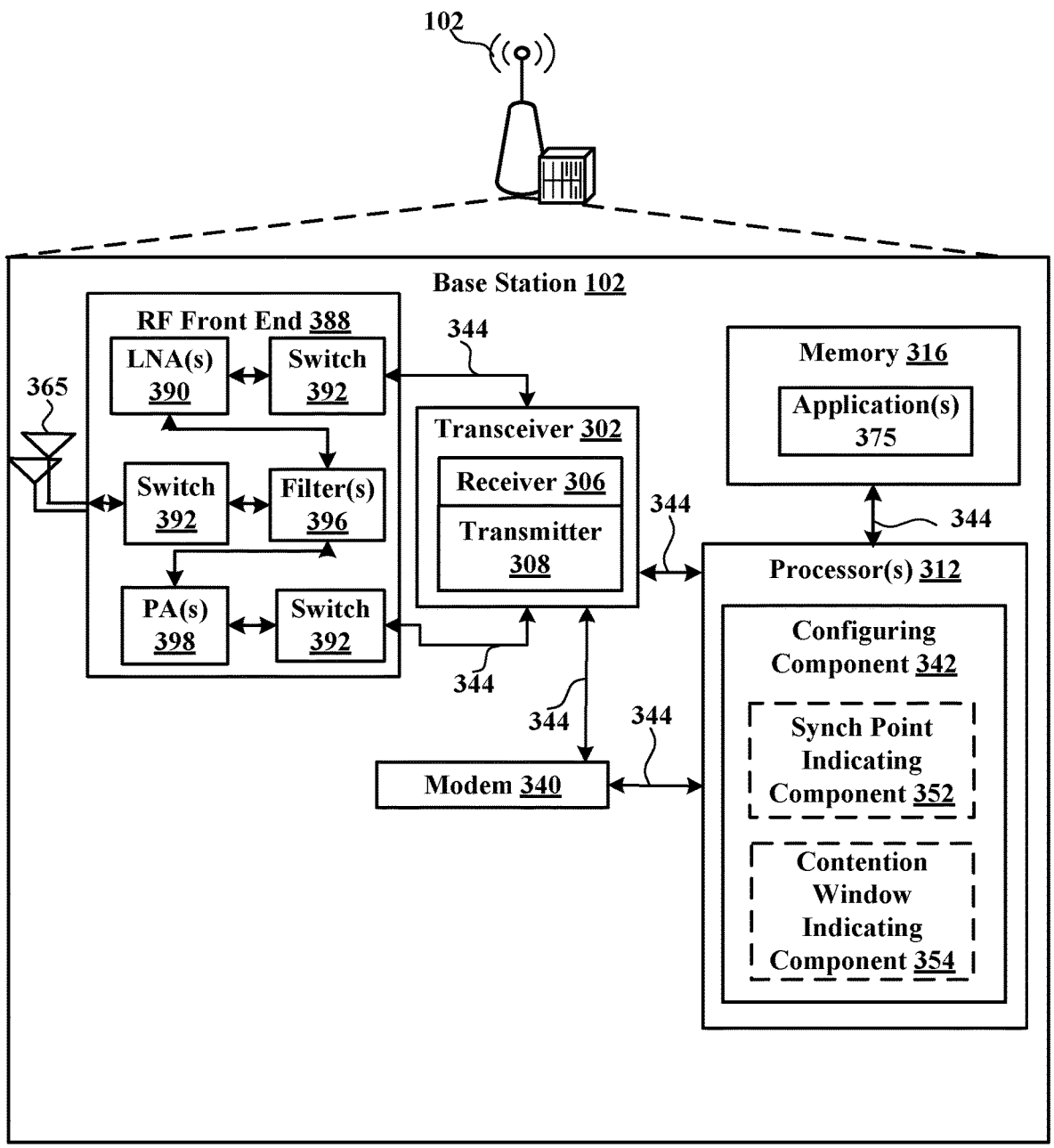
FIG. 3 is a block diagram illustrating an exemplary base station, in accordance with various aspects of the present disclosure.
Figure 4:
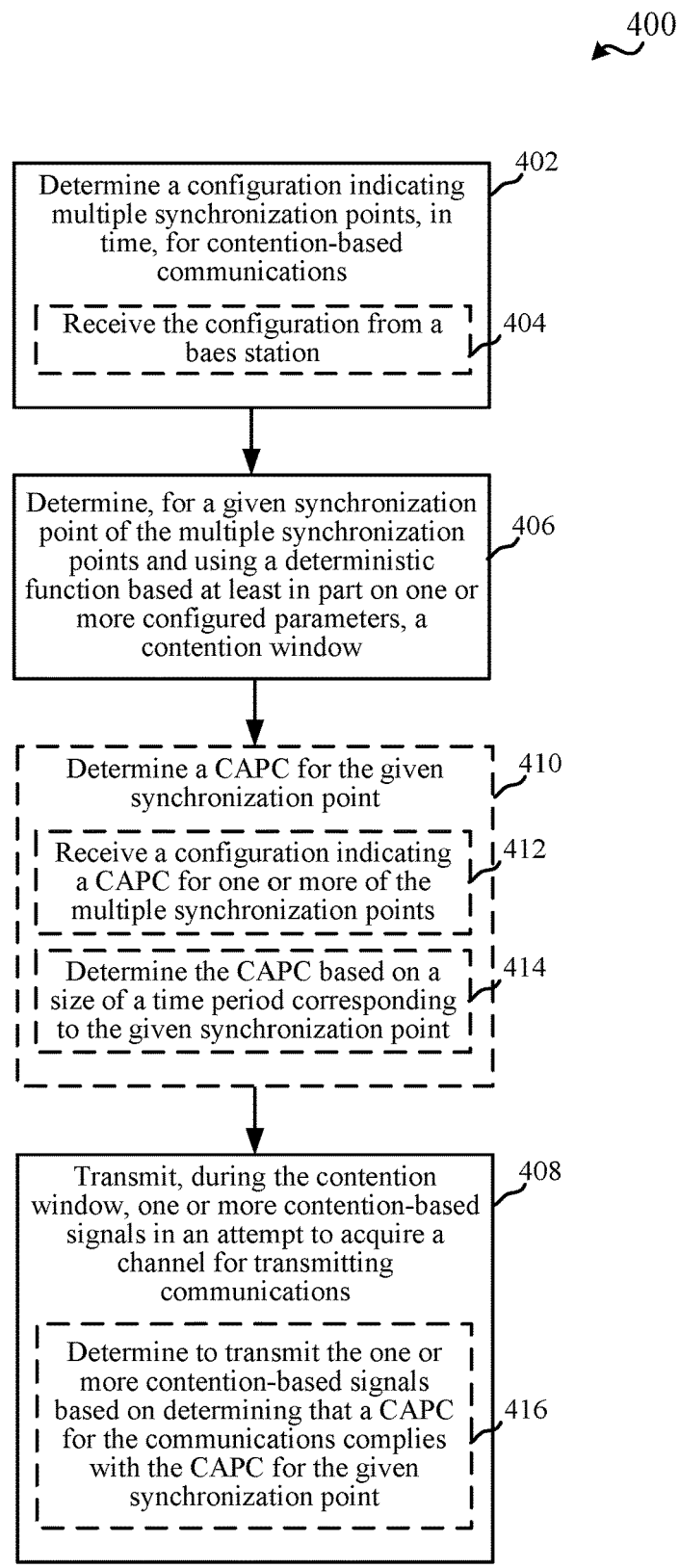
FIG. 4 is a flow chart illustrating an exemplary method for aligning contention-based communications, in accordance with various aspects of the present disclosure.
Figure 5:
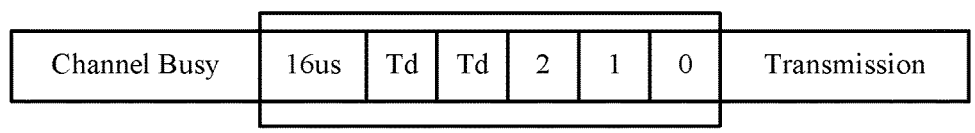
FIG. 5 illustrates exemplary timelines for category (CAT)-4 listen-before-talk (LBT) communications, in accordance with various aspects of the present disclosure.
Figure 5:
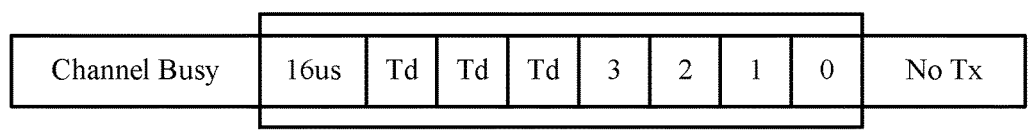
Figure 6:
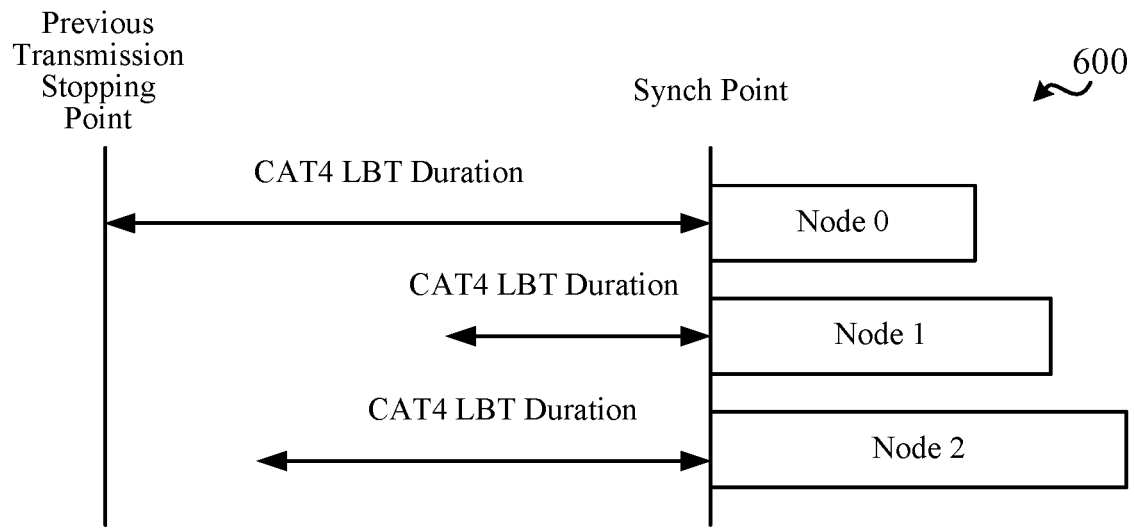
FIG. 6 illustrates exemplary unaligned and aligned timelines for CAT-4 LBT communications, in accordance with various aspects of the present disclosure.
Figure 6:
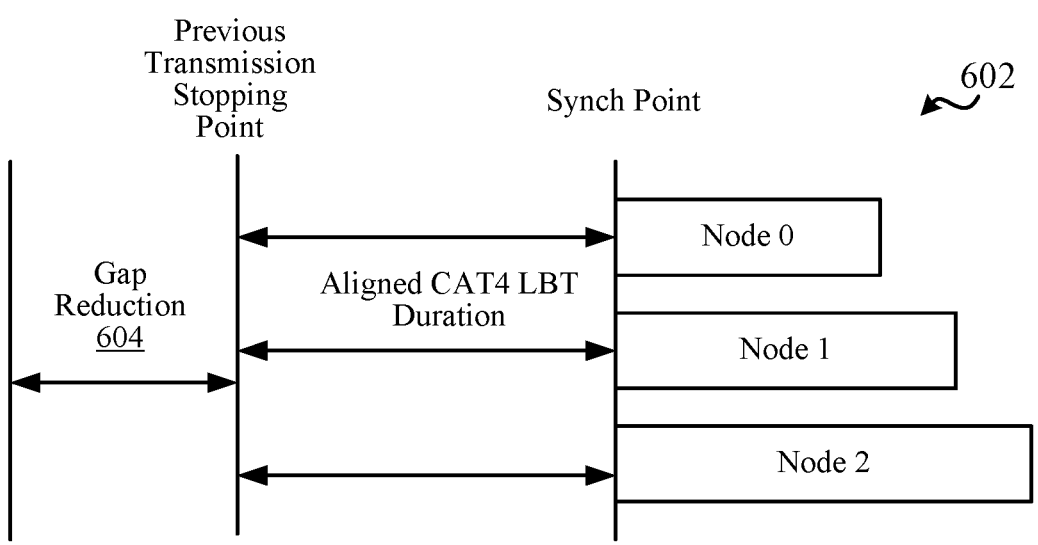
Figure 7:
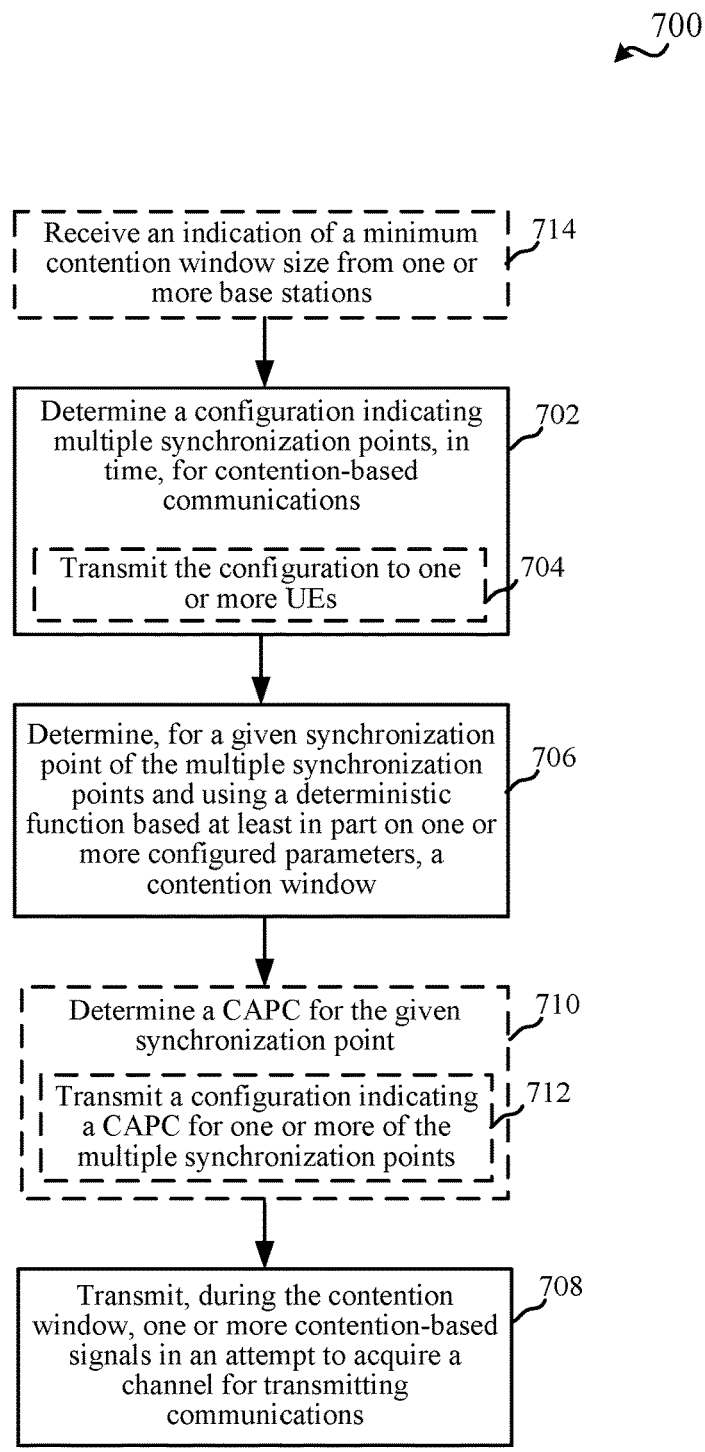
FIG. 7 is a flow chart illustrating an exemplary method for aligning contention-based communications, in accordance with various aspects of the present disclosure.

Turning now to FIGS. 2-8, aspects are depicted with reference to one or more components and one or more methods that may perform the actions or operations described herein, where aspects in dashed line may be optional. Although the operations described below in FIGS. 4 and 7 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for substantially aligning, in time, contention-based communications, as described further herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. In an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, in an aspect, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, in an aspect, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, in an aspect, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, in an aspect, one or more filters 296 can be used by RF front end 288 to filter a received signal to obtain an input RF signal. Similarly, in an aspect, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, in an aspect, one or more base stations 102 or one or more cells associated with one or more base stations 102. In an aspect, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a synch point determining component 252 for determining a time instance corresponding to a synchronization point, and/or a contention window determining component 254 for determining a contention window, or contention window, for transmitting LBT signals related to communications at the synchronization point, as described further herein.

In an aspect, the processor(s) 212 may correspond to one or more of the processors described in connection with the UE in FIG. 8. Similarly, the memory 216 may correspond to the memory described in connection with the UE in FIG. 8.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 configuring contention-based communications to be substantially aligned in time, as described further herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a synch point indicating component 352 for indicating parameters regarding multiple synchronization points (e.g., a time instance corresponding to synchronization points, periodicity for determining synchronization points, etc.), and/or a contention window indicating component 354 for indicating one or more parameters for determining a contention window related to communications at a given synchronization point, as described further herein.

In an aspect, the processor(s) 312 may correspond to one or more of the processors described in connection with the base station in FIG. 8. Similarly, the memory 316 may correspond to the memory described in connection with the base station in FIG. 8.

FIG. 4 illustrates a flow chart of an example of a method 400 for aligning contention-based communications. In an aspect, a UE 104 can perform the functions described in method 400 using one or more of the components described in FIGS. 1-2. Moreover, in an aspect, the UE 104 can represent substantially any downstream node that is downstream from a base station or other access point, which may include a UE or UE function provided for factory or automated equipment or IIoT devices, etc.

In method 400, at Block 402, a configuration for indicating multiple synchronization points, in time, for contention-based communications can be determined. In an aspect, synch point determining component 252, e.g., in conjunction with processor(s) 212, memory 216, transceiver 202, communicating component 242, etc., can determine the configuration indicating the multiple synchronization points, in time, for contention-based communications. In an aspect, synch point determining component 252 can determine the synchronization points as points (e.g., time instances) over a period of time where communication procedures can be initiated. In an aspect, the synchronization points may or may not be uniformly distributed over the period of time. Moreover, in an aspect, the synchronization points can be shared for downlink and uplink communications. In addition, in an aspect, the synchronization points can be configured as periodic fixed patterns, and may be configured so that transmissions in one synchronization point can stop with a large enough gap before a next synchronization point.

In determining the configuration at Block 402, optionally at Block 404, the configuration can be received from a base station. In an aspect, synch point determining component 252, e.g., in conjunction with processor(s) 212, memory 216, transceiver 202, communicating component 242, etc., can receive the configuration from the base station (e.g., a base station serving the UE 104). In an aspect, synch point determining component 252 can receive the configuration from the base station over radio resource control (RRC) signaling, where the configuration can indicate specific time instances for the synchronization points, one or more periodicities for determining one or more periodic fixed patterns of synchronization points, etc., parameters for determining synchronization points based on network load, capacity, data rate, etc., and/or the like. In an aspect, the synchronization points may not be uniformly distributed in time, but may have a pattern of period between synchronization points.

In an aspect, each synchronization point can define a time instance at which nodes are to initiate contention-based communication procedures. In an aspect, the nodes can use a LBT procedure that begins at the synchronization point in order to potentially acquire the channel and transmit communications to one or more other nodes. In an aspect, the LBT procedure can include a CAT-2 LBT procedure, or a CAT-4 LBT procedure. The CAT-4 LBT procedure can be defined by a defer period after the beginning of the synchronization point during which the node does not transmit, and a contention window during which the node can transmit signals to contend for the channel. An example, is shown in FIG. 5.

FIG. 5 illustrates examples of timelines 500, 502 for a CAT-4 LBT procedure. As shown in timelines 500, 502, in CAT-4 LBT, the defer period can include a fixed period (e.g., 16 microsecond (us)) followed by one or more dynamic periods, which can be a number, n, multiplied by a fixed value (e.g., 9 us), where n can correspond to a channel access priority class (CAPC) of communications. In timeline 500, n=2, and in timeline 502, n=3. In CAT-4 LBT, the contention window can be another number, N, multiplied by a fixed value (e.g., 9 us), where N can be a random number between 0 and a contention window size. In timeline 500, N=3, and in timeline 502, N=4. The node that acquires the channel can transmit after the contention window, as shown in timeline 500, and the other nodes can refrain from transmitted after counting down the contention window. In this regard, the nodes may have different time lines ending at different times when using conventional CAT-4 LBT.

In method 400, at Block 406, a contention window can be determined, for a given synchronization point of the multiple synchronization points and using a deterministic function based at least in part on one or more configured parameters. In an aspect, contention window determining component 254, e.g., in conjunction with processor(s) 212, memory 216, transceiver 202, communicating component 242, etc., can determine, for the given synchronization point (e.g., a next or current synchronization point) of the multiple synchronization points and using the deterministic function based at least in part on one or more configured parameters, the contention window. In an aspect, using a deterministic function can ensure that the nodes determine the same contention window (e.g., determine a same value for N), which can allow for more certainty in contention signaling among the nodes, which can in turn allow for better certainty in scheduling the synchronization points such that nodes have enough time to transmit before a next synchronization point. Using the same contention window can at least provide for some gap reduction in possible timelines used by the nodes. An example is shown in FIG. 6.

FIG. 6 illustrates an example of a timeline 600 where CAT-4 LBT is not aligned, and a timeline 602 where CAT-4 LBT is more aligned (e.g., by aligning at least the contention window). As shown, where the CAT-4 LBT is more aligned in timeline 602, the pervious transmission stopping point before a next synchronization point can be extended, providing a gap reduction 604. Such gap reductions may allow for longer or additional transmissions, shorter delay between synchronization points, etc.

In an aspect, contention window determining component 254 can determine the one or more configured parameters in a configuration from the base station (e.g., in the configuration received at Block 404 or other configuration). In an aspect, the configuration may include the one or more configured parameters as applied to each of multiple synchronization points or corresponding patterns, parameters common for all synchronization points, etc. In an aspect, the one or more configured parameters may include a common configurable seed for determining the random number. In another aspect, the deterministic function can be based on an element of time, such as a slot index or symbol index corresponding to the synchronization point. In an aspect, the wireless communications may be based on orthogonal frequency division multiplexing (OFDM) symbols and/or slots including multiple OFDM symbols, where the OFDM symbols and/or slots can have a corresponding index indicated by the base station. Thus, in an aspect, contention window determining component 254 can determine the contention window (e.g., N) based at least in part on the symbol or slot index and/or based on a common configurable seed for determining the random number, etc., such that each node (e.g., each UE, each base station, etc., in the controlled environment) can determine the same value contention window (e.g., value N) for the same synchronization point. In this way, in an aspect, all nodes starting at the same time can use the same random number, thus the same (or similar) CAT-4 LBT length (where the CAT-4 LBT length is further based on the n value, which may be dependent on CAPC). At different time instances (e.g., synchronization points), however, the random number can be random (or different). In this regard, the gap for each synchronization point, as described, may only need to cover the common window size, instead of a worst case window size (e.g., as shown in FIG. 6). In addition, in an aspect, the n value for the defer period in CAT-4 LBT can also be based on (or specific for) the slot or symbol index (or other unit of time corresponding to the synchronization point), and accordingly each node may determine the same total CAT-4 LBT length (e.g., defer period and contention window) for a given synchronization point in this regard.

In method 400, at Block 408, one or more contention-based signals can be transmitted, during the contention window, in an attempt to acquire a channel for transmitting communications. In an aspect, communicating component 242, e.g., in conjunction with processor(s) 212, memory 216, transceiver 202, etc., can transmit, during the contention window, one or more contention-based signals (e.g., LBT signals) in an attempt to acquire the channel for transmitting communications. Where transmission of the one or more contention-based signals yields the channel, the UE 104 can transmit communications over the channel. Where transmission of the one or more contention-based signals does not yield the channel during the contention window, the UE 104 can refrain from transmitting communications, and can attempt transmitting contention-based signals after the next synchronization point.

In one aspect, the contention window size, based on which the contention window (N) can be determined, can be adjusted based on one or more factors, such as congestion. Contention window size adjustment can be a mechanism in LBE to backoff when there is potential congestion, where the contention window can increase in size (e.g., double, up to a maximum), and when there is no congestion, the contention window resets to a minimum size. The adjustment can be driven by decoding errors (e.g., decoding error is used as an approximation for collision event). However, decoding error may naturally happen even if there is no collision. There are implementation based techniques that can reduce the target block error rate (BLER), so to the change of contention window doubling can be low, but still may not be avoidable. The contention window size can be per node (due to independent error events), and in general may not be aligned across nodes, and one node does not know the contention window size of another node (and thus may determine a different value of N). Different contention window size can thus lead to different random number, N, determination.

In this aspect, in determining the contention window at Block 406, the contention window determining component 254 can assume a minimum contention window size (e.g., for computing N or for otherwise ensuring the computed N is no more than the minimum contention window size). In an aspect, if a node is actually using minimum contention window size, the countdown of the contention window can occur in the determined contention window. If a node is not using minimum contention window size, the node may start countdown early (before entering the contention window) as the contention window may not be long enough for the countdown to complete. Opportunistically, communicating component 242 can complete the countdown of the contention window, transmitting contention-based signals during the contention window (if there is no dominant interferer above ED threshold), or if there is dominant interferer, communicating component 242 may complete the countdown over multiple contention windows (e.g., related to subsequent synchronization points). This implies the channel access may be delayed and the node may miss one or more synchronization point intervals.

In another aspect, a CAPC can be determined for a synchronization point, and/or transmitting the one or more contention-based signals can be based on determining that the corresponding communications are of the same (or compliant) CAPC for the synchronization point. In method 400, optionally at Block 410, a CAPC for the given synchronization point can be determined. In an aspect, synch point determining component 252, e.g., in conjunction with processor(s) 212, memory 216, transceiver 202, communicating component 242, etc., can determine the CAPC for the given synchronization point. In an aspect, the length of time between the synchronization point and the next synchronization point can allow for a channel occupancy time (COT) for transmitting an amount of data that may be sufficient for a given CAPC. In an aspect, given the synchronization points, a maximum transmission burst length after each synchronization point (until a next synchronization point) can be known. The maximum COT length from a synchronization point can be all the way to next synchronization point, with deducting the CAT-4 LBT gap length (e.g., the length of the defer period and/or contention window). Accordingly, CAPC values can be associated with a maximum COT duration and a contention window size. In an aspect, given the maximum COT from a synchronization point is X milliseconds (ms), a transmission may not need to use a CAPC with longer window and longer burst length than X ms.

In an aspect, in determining the CAPC at Block 410, optionally at Block 412, a configuration indicating the CAPC for one or more of the multiple synchronization points can be received. In an aspect, synch point determining component 252, e.g., in conjunction with processor(s) 212, memory 216, transceiver 202, communicating component 242, etc., can receive the configuration indicating the CAPC for the one or more of the multiple synchronization points. In an aspect, this configuration may be received with, and/or may be part of, the configuration received at Block 404 or may be received as a separate configuration from the base station (e.g., using RRC signaling, etc.). In one aspect, in the configuration received at Block 404, the CAPC may be indicated for each synchronization point or a common CAPC for all synchronization points, etc.

In another aspect, in determining the CAPC at Block 410, optionally at Block 414, the CAPC can be determined based on a size of a time period corresponding to the given synchronization point. In an aspect, synch point determining component 252, e.g., in conjunction with processor(s) 212, memory 216, transceiver 202, communicating component 242, etc., can determine the CAPC based on the size of the time period corresponding to the given synchronization point. In an aspect, synch point determining component 252 can determine the CAPC that can be associated with the maximum COT duration and/or the contention window size of the synchronization point, as described above.

In any case, in an aspect, communicating component 242 can use the CAPC associated with the synchronization point in determining the CAT-4 LBT gap length, or otherwise in determining the start of the contention window. In an aspect, communicating component 242 can use the CAPC to determine the defer period (e.g., the value of n), which may be based on CAPC, as described. In this aspect, each node can determine the same value of n based on determining the same CAPC for the synchronization point, and thus may determine the same CAT-4 LBT gap length based on determining the same n and N values, as described above.

In transmitting the one or more contention-base signals at Block 408, optionally at Block 410, it can be determined to transmit the one or more contention-based signals based on determining that a CAPC for the communications complies with the CAPC for the given synchronization point. In an aspect, communicating component 242, e.g., in conjunction with processor(s) 212, memory 216, transceiver 202, etc., can determine to transmit the one or more contention-based signals based on determining that the CAPC for the communications complies with the CAPC for the given synchronization point. In an aspect, if the UE 104 is not using or is not of the CAPC for the synchronization point, it may refrain from transmitting contention-based signals in the contention window altogether, and may wait for a next synchronization point.

FIG. 7 illustrates a flow chart of an example of a method 700 for configuring nodes for aligning contention-based communications. In an aspect, a base station 102 can perform the functions described in method 700 using one or more of the components described in FIGS. 1 and 3.

In method 700, at Block 702, a configuration for indicating multiple synchronization points, in time, for contention-based communications can be determined. In an aspect, synch point indicating component 352, e.g., in conjunction with processor(s) 312, memory 316, transceiver 302, configuring component 342, etc., can determine the configuration indicating the multiple synchronization points, in time, for contention-based communications. In an aspect, synch point indicating component 352 can determine the synchronization points as points (e.g., time instances) over a period of time where communication procedures can be initiated (e.g., as described above with reference to Block 402 of method 400). In an aspect, the synchronization points can be configured as periodic fixed patterns, and may be configured so that transmissions in one synchronization point can stop with a large enough gap before a next synchronization point. In one aspect, synch point indicating component 352 can generate the configuration or can receive the configuration from a core network node or another base station, etc.

In determining the configuration at Block 702, optionally at Block 704, the configuration can be transmitted to one or more UEs. In an aspect, synch point indicating component 352, e.g., in conjunction with processor(s) 312, memory 316, transceiver 302, configuring component 342, etc., can transmit the configuration to the one or more UEs (e.g., UE 104 or other downstream nodes that may be served by the base station 102). In an aspect, synch point indicating component 352 can transmit the configuration to the one or more UEs using RRC signaling, where the configuration can indicate specific time instances for the synchronization points, one or more periodicities for determining one or more periodic fixed patterns of synchronization points, etc., parameters for determining synchronization points based on network load, capacity, data rate, etc., and/or the like (e.g., as described in reference to Block 404 of method 400).

In method 700, at Block 706, a contention window can be determined, for a given synchronization point of the multiple synchronization points and using a deterministic function based at least in part on one or more configured parameters. In an aspect, contention window indicating component 354, e.g., in conjunction with processor(s) 312, memory 316, transceiver 302, configuring component 342, etc., can determine, for the given synchronization point (e.g., a next or current synchronization point) of the multiple synchronization points and using the deterministic function based at least in part on one or more configured parameters, the contention window (e.g., as described above with reference to Block 406 of method 400). In an aspect, using a deterministic function can ensure that the nodes determine the same contention window (e.g., determine a same value for N), which can allow for more certainty in contention signaling among the nodes, which can in turn allow for better certainty in scheduling the synchronization points such that nodes have enough time to transmit before a next synchronization point.

In an aspect, contention window indicating component 354 can indicate the one or more configured parameters in a configuration transmitted to one or more UEs (e.g., in the configuration transmitted at Block 704 or other configuration). In an aspect, the configuration may include the one or more configured parameters as applied to each of multiple synchronization points or corresponding patterns, parameters common for all synchronization points, etc. In an aspect, the one or more configured parameters may include a common configurable seed for determining the random number. In another aspect, the deterministic function can be based on an element of time, such as a slot index or symbol index corresponding to the synchronization point, as described. In an aspect, contention window indicating component 354 can determine the contention window (e.g., N) based at least in part on the symbol or slot index and/or based on a common configurable seed for determining the random number, etc. (and/or may configure the common configurable seed to the one or more UEs), such that each node (e.g., each UE, each base station, etc., in the controlled environment) can determine the same value contention window (e.g., value N) for the same synchronization point, as described.

In method 700, at Block 708, one or more contention-based signals can be transmitted, during the contention window, in an attempt to acquire a channel for transmitting communications. In an aspect, configuring component 342, e.g., in conjunction with processor(s) 312, memory 316, transceiver 302, etc., can transmit, during the contention window, one or more contention-based signals (e.g., LBT signals) in an attempt to acquire the channel for transmitting communications. Where transmission of the one or more contention-based signals yields the channel, the UE 104 can transmit communications over the channel. Where transmission of the one or more contention-based signals does not yield the channel during the contention window, the UE 104 can refrain from transmitting communications, and can attempt transmitting contention-based signals after the next synchronization point.

As described, in an aspect, the contention window size can be adjusted based on one or more factors. In one aspect, (e.g., where there is ideal backhaul), the base station can signal its contention window size to other neighbor base stations, and/or receive contention window sizes from the other base stations, over backhaul. In this aspect, determining the contention window at Block 706 can be based on the random number generated with the maximum of contention window sizes in a neighborhood. Similarly, in an aspect, contention window indicating component 354 can configure the maximum of the contention window sizes to its served UEs for determining the same contention window.

In another aspect, a CAPC can be determined for a synchronization point, and/or transmitting the one or more contention-based signals can be based on determining that the corresponding communications are of the same (or compliant) CAPC for the synchronization point, as described above. In method 700, optionally at Block 710, a CAPC for the given synchronization point can be determined. In an aspect, synch point indicating component 352, e.g., in conjunction with processor(s) 312, memory 316, transceiver 302, configuring component 342, etc., can determine the CAPC for the given synchronization point (e.g., as described with reference to Block 410 of method 400).

In an aspect, in determining the CAPC at Block 710, optionally at Block 712, a configuration indicating the CAPC for one or more of the multiple synchronization points can be transmitted. In an aspect, synch point indicating component 352, e.g., in conjunction with processor(s) 312, memory 316, transceiver 302, configuring component 342, etc., can transmit the configuration indicating the CAPC for the one or more of the multiple synchronization points. In an aspect, this configuration may be transmitted with, and/or may be part of, the configuration transmitted at Block 704 or may be transmitted as a separate configuration to the one or more UEs (e.g., using RRC signaling, etc.). In one aspect, in the configuration transmitted at Block 704, synch point indicating component 352 can indicate the CAPC for each synchronization point or a common CAPC for all synchronization points, etc.

In any case, in an aspect, configuring component 342 can use the CAPC associated with the synchronization point in determining the CAT-4 LBT gap length, or otherwise in determining the start of the contention window. In an aspect, configuring component 342 can use the CAPC to determine the defer period (e.g., the value of n), which may be based on CAPC, as described. In this aspect, each node can determine the same value of n based on determining the same CAPC for the synchronization point, and thus may determine the same CAT-4 LBT gap length based on determining the same n and N values, as described above.

Figure 8:
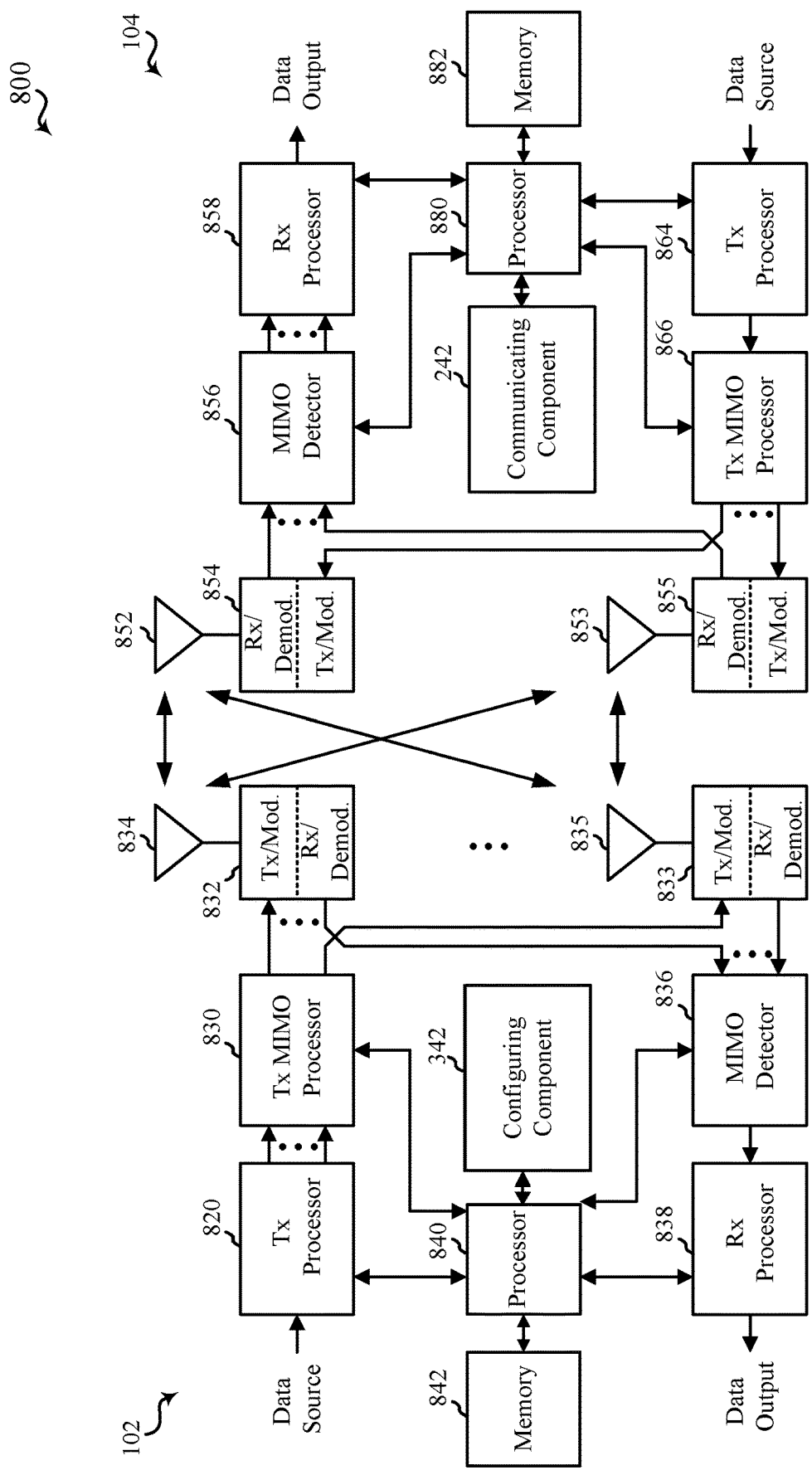
FIG. 8 is a block diagram illustrating an exemplary MIMO communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. In an aspect, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1-2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a communicating component 242 (see e.g., FIGS. 1 and 2).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a configuring component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 800. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 800.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
receiving a configuration indicating timing information for each of multiple synchronization points, in time, for transmitting contention-based communications;
using a deterministic function on the timing information indicated in the configuration for each of the multiple synchronization points to determine, for each of the multiple synchronization points, a contention window; and
transmitting, during the contention window for each given synchronization point of the multiple synchronization points, one or more contention-based signals in an attempt to acquire a channel for transmitting the contention-based communications at the given synchronization point.

2. The method of claim 1, wherein the timing information includes, for each given synchronization point of the multiple synchronization points, an indication of a time period associated with the given synchronization point.

3. The method of claim 2, wherein the indication of the time period includes an index of a symbol or a slot associated with the given synchronization point.

4. The method of claim 1, wherein the configuration further indicates a common seed to facilitate determining the contention window based on a common random number.

5. The method of claim 1, wherein the contention window is further based at least in part on a minimum contention window size.

6. The method of claim 1, wherein the multiple synchronization points are shared between uplink and downlink communications.

7. The method of claim 1, further comprising receiving a second configuration indicating a channel access priority class (CAPC) for one or more of the multiple synchronization points.

8. The method of claim 7, wherein the second configuration indicates the CAPC for each of the multiple synchronization points.

9. The method of claim 1, further comprising determining, based on a size of a time period corresponding to the given synchronization point, a channel access priority class (CAPC) for transmitting communications during the time period.

10. The method of claim 1, wherein receiving the configuration comprises receiving the configuration from a base station.

11. The method of claim 1, wherein receiving the configuration comprises generating the configuration, and further comprising transmitting the configuration to one or more user equipment (UEs).

12. The method of claim 11, further comprising transmitting, to one or more base stations, a minimum contention window size used in determining the contention window.

13. The method of claim 11, further comprising transmitting, to the one or more UEs, a configuration indicating a channel access priority class (CAPC) for one or more of the multiple synchronization points.

14. The method of claim 13, wherein the configuration indicates the CAPC for each of the multiple synchronization points.

15. An apparatus for wireless communication, comprising:
a transceiver;
a memory configured to store instructions; and
one or more processors communicatively coupled with the memory and the transceiver, wherein the one or more processors are configured to:
receive a configuration indicating timing information for each of multiple synchronization points, in time, for transmitting contention-based communications;
use a deterministic function on the timing information indicated in the configuration for each of the multiple synchronization points to determine, for each of the multiple synchronization points, a contention window; and
transmit, during the contention window for each given synchronization point of the multiple synchronization points, one or more contention-based signals in an attempt to acquire a channel for transmitting the contention-based communications at the given synchronization point.

16. The apparatus of claim 15, wherein the timing information includes, for each given synchronization point of the multiple synchronization points, an indication of a time period associated with the given synchronization point.

17. The apparatus of claim 16, wherein the indication of the time period includes an index of a symbol or a slot associated with the given synchronization point.

18. The apparatus of claim 15, wherein the configuration further indicates a common seed to facilitate determining the contention window based on a common random number.

19. The apparatus of claim 15, wherein the contention window is based at least in part on a minimum contention window size.

20. The apparatus of claim 15, wherein the multiple synchronization points are shared between uplink and downlink communications.

21. The apparatus of claim 15, wherein the one or more processors are further configured to receive a second configuration indicating a channel access priority class (CAPC) for one or more of the multiple synchronization points.

22. The apparatus of claim 21, wherein the second configuration indicates the CAPC for each of the multiple synchronization points.

23. The apparatus of claim 15, wherein the one or more processors are further configured to determine, based on a size of a time period corresponding to the given synchronization point, a channel access priority class (CAPC) for transmitting communications during the time period.

24. The apparatus of claim 15, wherein the one or more processors are configured to receive the configuration at least in part by receiving the configuration from a base station.

25. The apparatus of claim 15, wherein the one or more processors are configured to receive the configuration at least in part by generating the configuration, and wherein the one or more processors are further configured to transmit the configuration to one or more user equipment (UEs).

26. The apparatus of claim 25, wherein the one or more processors are further configured to transmit, to one or more base stations, a minimum contention window size used in determining the contention window.

27. The apparatus of claim 25, wherein the one or more processors are further configured to transmit, to the one or more UEs, a configuration indicating a channel access priority class (CAPC) for one or more of the multiple synchronization points.

28. The apparatus of claim 27, wherein the configuration indicates the CAPC for each of the multiple synchronization points.

29. An apparatus for wireless communication, comprising:
- means for receiving a configuration indicating timing information for each of multiple synchronization points, in time, for transmitting contention-based communications;
- means for using a deterministic function on the timing information indicated in the configuration for each of the multiple synchronization points to determine, for each of the multiple synchronization points, a contention window; and
- means for transmitting, during the contention window for each given synchronization point of the multiple synchronization points, one or more contention-based signals in an attempt to acquire a channel for transmitting the contention-based communications at the given synchronization point.

30. The apparatus of claim 29, wherein the timing information includes, for each given synchronization point of the multiple synchronization points, an indication of a time period associated with the given synchronization point.

31. The apparatus of claim 30, wherein the indication of the time period includes an index of a symbol or a slot associated with the given synchronization point.

32. A non-transitory computer-readable medium, comprising code executable by one or more processors for wireless communications, the code comprising code for:
- receiving a configuration indicating timing information for each of multiple synchronization points, in time, for transmitting contention-based communications;
- using a deterministic function on the timing information indicated in the configuration for each of the multiple synchronization points to determine, for each of the multiple synchronization points, a contention window; and
- transmitting, during the contention window for each given synchronization point of the multiple synchronization points, one or more contention-based signals in an attempt to acquire a channel for transmitting the contention-based communications at the given synchronization point.

33. The non-transitory computer-readable medium of claim 32, wherein the timing information includes, for each given synchronization point of the multiple synchronization points, an indication of a time period associated with the given synchronization point.

34. The non-transitory computer-readable medium of claim 33, wherein the indication of the time period includes an index of a symbol or a slot associated with the given synchronization point.

35. An apparatus for wireless communication, comprising:
- a transceiver;
- a memory configured to store instructions; and
- one or more processors communicatively coupled with the memory and the transceiver, wherein the one or more processors are configured to:
  - receive a first configuration indicating timing information for each of multiple synchronization points, in time, for transmitting contention-based communications;
  - receive a second configuration indicating a channel access priority class (CAPC) for one or more of the multiple synchronization points;
  - use a deterministic function on the timing information indicated in the configuration for each of the multiple synchronization points, including a slot index or a symbol index for the multiple synchronization point, to determine, for each of the multiple synchronization points, a contention window; and
  - transmit, during the contention window for each given synchronization point of the multiple synchronization points, one or more contention-based signals in an attempt to acquire a channel for transmitting the contention-based communications at the given synchronization point.

* * * * *